(12) United States Patent  
Emigh

(10) Patent No.: US 8,188,859 B1  
(45) Date of Patent: *May 29, 2012

(54) NAVIGATION ASSISTANCE FOR A PASSENGER ON A PUBLIC CONVEYANCE

(76) Inventor: Aaron T. Emigh, Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,824

(22) Filed: Jan. 16, 2012

Related U.S. Application Data

(63) Continuation of application No. 11/895,151, filed on Aug. 22, 2007, now Pat. No. 8,102,255.

(60) Provisional application No. 60/839,216, filed on Aug. 22, 2006.

(51) Int. Cl.  
*G08B 1/08* (2006.01)

(52) U.S. Cl. .................................. 340/539.13

(58) Field of Classification Search .......... 340/539.13, 340/994, 995.19, 433; 701/29  
See application file for complete search history.

(56) References Cited

U.S. PATENT DOCUMENTS

| | | | |
|---|---|---|---|
| 6,477,462 B1* | 11/2002 | Rychlak | 701/410 |
| 8,138,907 B2* | 3/2012 | Barbeau et al. | 340/457 |
| 2003/0137435 A1* | 7/2003 | Haddad et al. | 340/994 |
| 2006/0009905 A1* | 1/2006 | Soderberg et al. | 701/200 |
| 2007/0024440 A1* | 2/2007 | Moran et al. | 340/539.13 |

* cited by examiner

*Primary Examiner* — Phung Nguyen

(57) ABSTRACT

In some embodiments, techniques comprise receiving route data at a portable device, wherein the portable device is personal to a passenger on a public conveyance, wherein the route data is associated with a public transit route, wherein the public conveyance is following the public transit route, and wherein the route data includes information relating to a stop; determining a destination, wherein the destination is related to the stop; determining a current location of the portable device; displaying the current location in conjunction with a route map, wherein the route map includes a representation of the route data, and wherein the current location is indicated on the route map; determining, based at least in part on the current location, that the portable device has nearly reached the destination; and responsive to determining that the portable device has nearly reached the destination, providing an alert at the portable device.

24 Claims, 3 Drawing Sheets

NAVIGATION ASSISTANCE FOR A PASSENGER ON A PUBLIC CONVEYANCE

CROSS REFERENCE TO RELATED APPLICATIONS

This application is a continuation of U.S. patent application Ser. No. 11/895,151, entitled TRANSIT-RELATED DATA PROCESSING, filed Aug. 22, 2007, now U.S. Pat. No. 8,102,255, which is incorporated herein by reference for all purposes, which claims priority to U.S. Provisional Patent Application No. 60/839,216, entitled INFORMATION PROCESSING, filed Aug. 22, 2006, which is incorporated herein by reference for all purposes.

FIELD OF THE INVENTION

The present invention relates generally to the area of location-aware information processing. More specifically, techniques for sharing transit route information and processing locations relative to a route are disclosed.

BACKGROUND OF THE INVENTION

Portable electronic devices are widely available that include some form of networking capabilities, such as wireless networking. Technology for transmitting data has become commonplace. Wireless networks have been established on public conveyances such as airplanes and trains.

Public conveyances such as airplanes, trains, subways and buses often operate on a predetermined route. Passengers on such conveyances must rely on their own understanding of the transit system, or interpret hard-to-understand announcements, to determine where they are and where they should get off. Current technology does not allow for personalized location-based alerts for passengers.

Accordingly, it would be useful to be able to select a destination associated with a public conveyance or transit system, and receive real-time status information as to the current location on the route and/or an alert when a destination or transfer point is reached, or will soon be reached. It would further be useful for a passenger to receive such information and alerts on a personal electronic device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
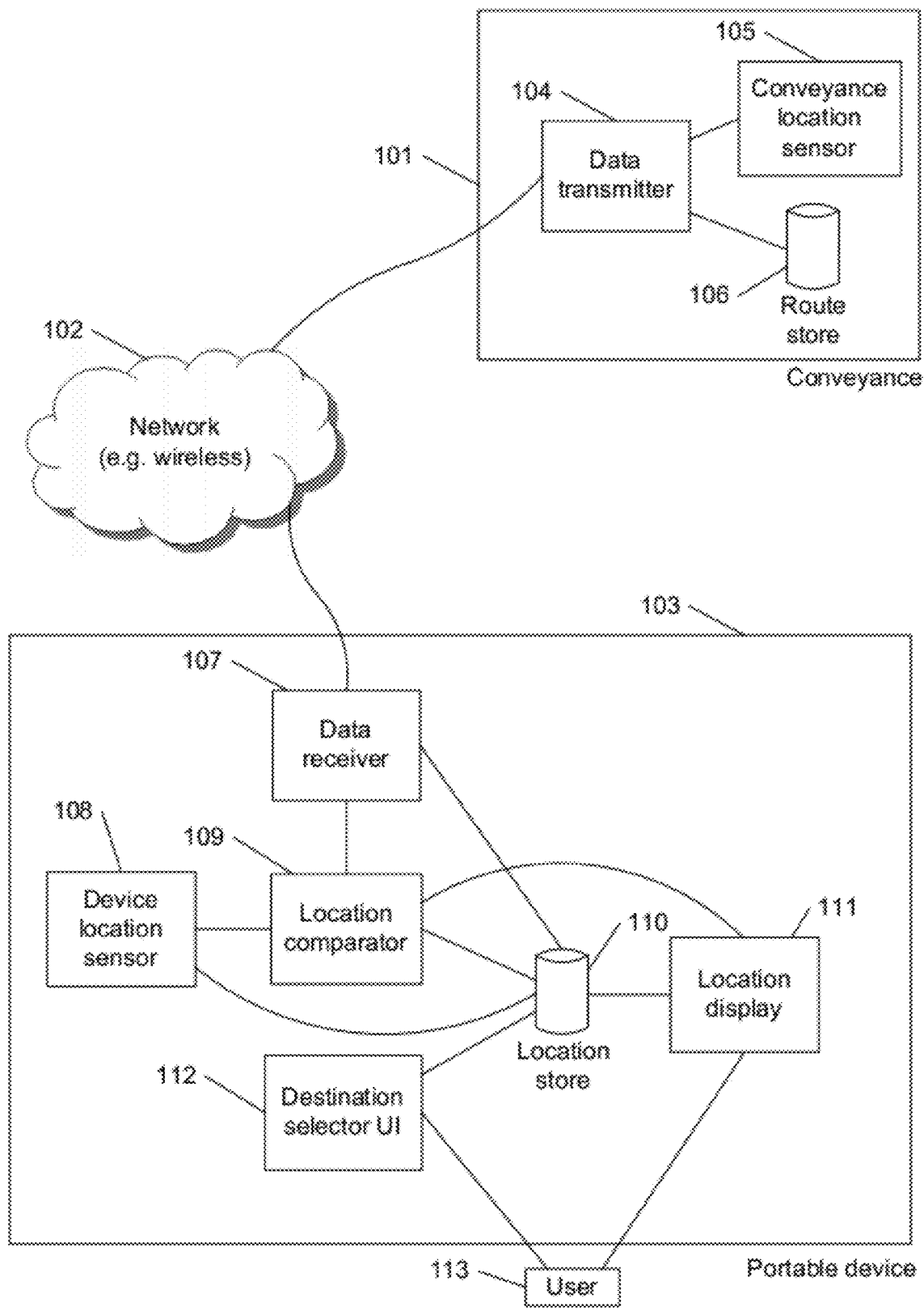
FIG. 1 is a diagram of a system for transit-related data processing, according to some embodiments.

FIG. 1 is a diagram of a system for transit-related data processing, according to some embodiments. In this example, conveyance 101 may transmit route and/or location related data to a portable device 103 via a network 102.

A conveyance 101 may be any public conveyance, such as a bus, plane or train (including light rail and subway). Examples of route related data include all or some stops associated with a route such as the route that conveyance 101 is running, such as stops from the current location to the end of the line in the current direction of travel; all stops on all routes related to a transit system of which conveyance 101 is a component; and stop(s) on any or all routes for which a transfer exists, such as a transfer to a line of the same transit system of which conveyance 101 is a component. In some embodiments, a stop may be associated with an identifier and/or metadata such as a name of a stop, possible transfer(s) at a stop, and/or a scheduled or projected time at which the stop is to be reached. Examples of location related data include location data expressed spatially (for example, as latitude and longitude) and symbolically (for example, as a name or identifier related to a stop related to the route being followed by conveyance 101, such as a bus or train stop). In some embodiments, location related data may include a distance relative to a stop, such as an indication that a current location is 0.5 miles past or before a stop, or 20% of the way to a next stop.

The network 102 may be any type of network, for example a public network such as the internet, a cellular phone network such as a GPRS network, or a point-to-point connection. In another example, the network 102 may be a wireless network such as an 802.11, GPRS or Bluetooth network. In some embodiments, the network 102 may include more than one network. An example of a network 102 including more than one network is a local area network connected to a public network such as the internet. An example of the use of such a network is for a conveyance 101 and a portable device 103 to be connected via a wireless network such as an 802.11 network or connected via Bluetooth, and for the wireless network to be connected to an external source of route information (not shown) via a public network such as the internet.

Portable device 103 may be any portable device capable of receiving data from network 102 and processing and displaying such data. Examples of portable device 103 include a portable computer, PDA, music player, and cell phone.

Conveyance 101 and portable device 103 have subcomponents discussed individually below.

A data transmitter 104 associated with conveyance 101 may transmit data associated with one or more routes, stops and/or locations via network 102. Examples of a data transmitter 104 include an 802.11 transmitter, a GPRS transmitter, and a Bluetooth transmitter. In some embodiments, such a transmitter may be combined with a receiver. In some embodiments, data associated with a route (including one or more stops associated with the route, transfer stop(s), and/or scheduled or projected arrival times) may be retrieved from route store 106. Route store 106 may be any form of storage, such as magnetic storage, RAM, optical storage, and/or flash memory. Route store 106 may include one or more files on a filesystem, one or more tables associated with a database, and/or one or more in-memory data structures such as lists, trees, hash tables, and/or other structures known to those skilled in the art. In some embodiments, data associated with a current location may be received from conveyance location sensor 105.

A conveyance location sensor 105 may determine a current location. A conveyance location sensor 105 may be any component(s) capable of detecting or receiving a location. Examples of components capable of detecting a location include a GPS receiver, and one or more accelerometers or gyroscopes. An example of a component capable of receiving a location is a wireless data receiver through which a current location may be received, for example from a transmitter operating at a fixed location, or a transmitter capable of determining its own location. Another example of a component capable of receiving a location is a cellular receiver that determines one or more cell towers with which it is communicating. Another example of a component capable of receiving a location is a sensor that receives an input from a conveyance operator such as a bus driver or a train conductor, wherein the input is associated with a current location (such as a button that can be pressed to indicate that a stop has been reached).

A data receiver 107 associated with portable device 103 may receive data associated with routes, stops and/or locations via network 102. In some embodiments, such data may originate with data transmitter 104. Examples of a data receiver 107 include an 802.11 receiver, a GPRS receiver, and a Bluetooth receiver. In some embodiments, such a receiver may be combined with a transmitter. In some embodiments, data associated with a route (including one or more stops associated with the route, transfer stop(s), and/or scheduled or projected arrival times) may be stored in location store 110.

Location store 110 may be any form of storage, such as magnetic storage, RAM, optical storage, and/or flash memory. Location store 110 may include one or more files on a filesystem, one or more tables associated with a database (for example, a table for routes and a table for observed locations), and/or one or more in-memory data structures such as lists, trees, hash tables, and/or other structures known to those skilled in the art. In some embodiments, data associated with a current location may be provided to location comparator 109.

In some embodiments, device location sensor 108 may determine a current location. A device location sensor 108 may be any component(s) capable of detecting or receiving a location. Examples of components capable of detecting a location include a GPS receiver, and one or more accelerometers or gyroscopes. An example of a component capable of receiving a location is a wireless data receiver through which a current location may be received, for example from a transmitter operating at a fixed location, or a transmitter capable of determining its own location. Another example of a component capable of receiving a location is a cellular receiver that determines one or more cell towers with which it is communicating. Device location sensor 108 may provide a current location to location comparator 109 and/or location store 110.

Location comparator 109 may receive a current or pending location (for example, a symbolic location or a spatial location) and determine whether it matches, exactly or approximately, a destination location (e.g. a final destination or a transfer destination). Such a destination location may be received or calculated by destination selector UI 112 and stored in location store 110. In various embodiments, a current location may be received from device location sensor 108 or data receiver 107. In some embodiments, location comparator 109 may determine that a destination location is nearly reached, and may trigger an alert either before or at the destination location. An example of triggering an alert is to provide information to location display 111 regarding the current location and/or the destination, and the proximity thereto.

Location display 111 may provide information to a user 113 indicating a current location from location store 110, for example displayed on a route retrieved from location store 110. Location display 111 may issue an indication that an alert has been triggered, for example when a destination stop is reached or nearing (for example, when a destination stop is one before the current stop, or when the current location is within a predetermined or specified distance from a destination stop, or when a stop one before a destination stop is departed). An example of an indication that an alert has been triggered is a visual indication, such as a popup window and/or text. Another example of an indication that an alert has been triggered is a noise, such as a beep or tone, or a speech synthesizer or playback of a recorded sound. Another example of an indication that an alert has been triggered is a vibration. Another example of an indication that an alert has been triggered is a hybrid of any of the foregoing indications, such as a combination of a noise and a visual indication.

Destination selector user interface 112 may present an interface to user 113 wherein a destination may be input and stored in location store 110. Examples of destination selector UI 112 include a button, a screen allowing data input, a touch-sensitive screen, a microphone allowing voice input, and any other way that a user 113 may indicate a destination. In some embodiments, a map of a current route and/or a whole or partial transit system map may be displayed. Destination selector UI 112 may receive a current location from location store 110, and may display the current location and/or route to aid selection of a destination, for example by enabling a user input selection event such as a click or touch on a touch-sensitive screen. Destination selector UI 112 may store a received destination in location store 110, for example spatially or symbolically (for example using an identifier associated with the destination). In some embodiments, a selected destination stop may be on the current route, or may be on an associated route such as a route that can be reached from the current route with one or more transfers. In some embodiments, such as when one or more transfers are required, one or more additional destinations may be created, such as one additional destination for each transfer required to reach the selected destination stop. Such additional destinations may herein be referred to as transfer destinations when necessary to distinguish them from a final destination.

Interactions from user 113 may be processed at location selector UI 112 and/or location display 111.

Additional details of the operation of the system of this FIG. 1 are discussed in conjunction with the remaining Figures.

Figure 2:
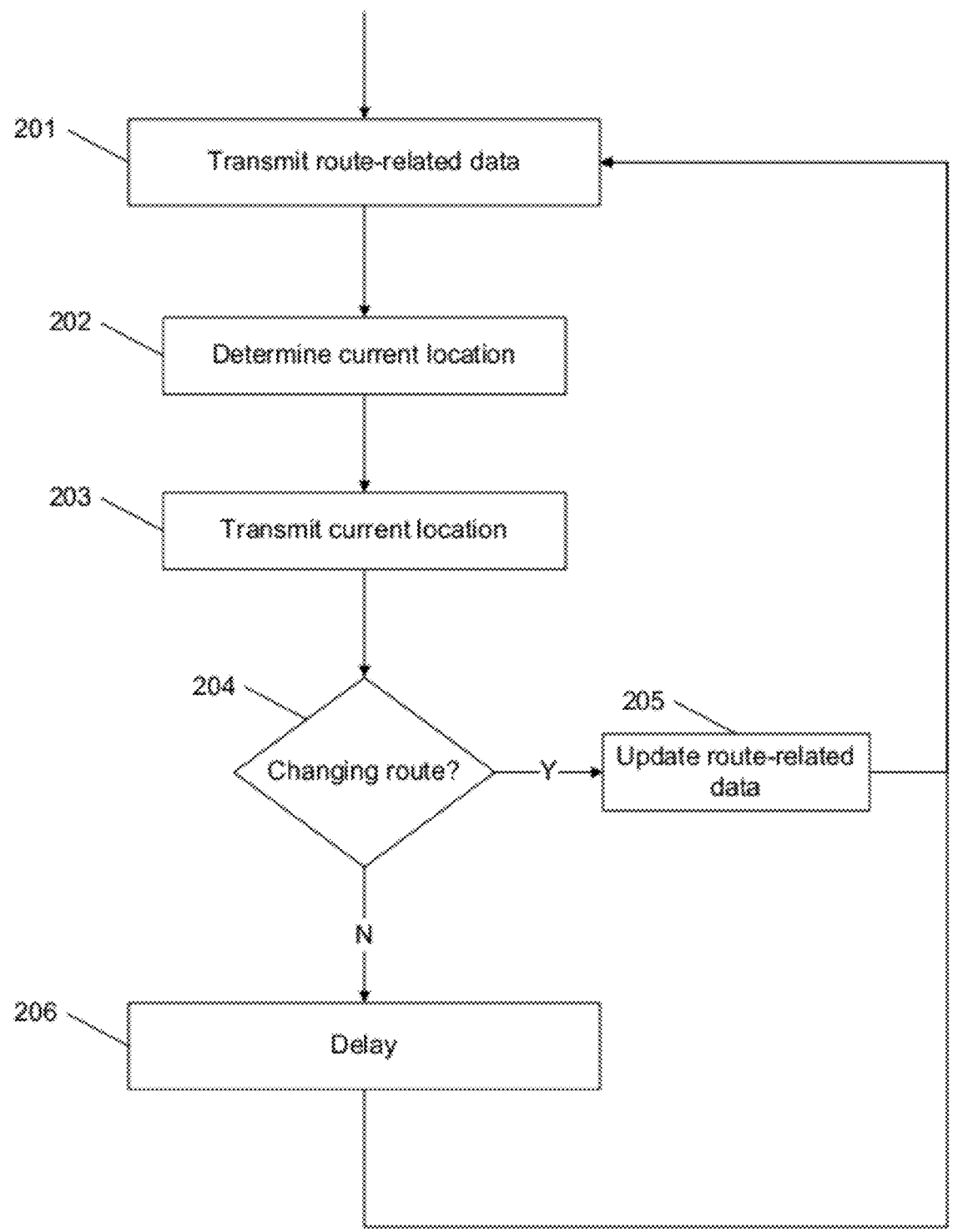
FIG. 2 is a flow diagram of a method for transmitting information relating to a route and optional location, according to some embodiments.

FIG. 2 is a flow diagram of a method for transmitting information relating to a route and optional location, according to some embodiments. In this example, route-related data is transmitted (201). Examples of route-related data are discussed in conjunction with conveyance 101 of FIG. 1, and include one or more stops associated with the route, for example all stops associated with the route or all stops from the current stop to the end of the line in the current direction of travel, one or more transfer stops, one or more routes to which a transfer is possible, and scheduled or projected arrival times. Transmission of such data may be performed over a network such as network 102 of FIG. 1, and may be performed in response to a query or in broadcast mode.

A current location may be determined (202). Examples of determining a current location are discussed in conjunction with conveyance location sensor 105 of FIG. 1, and include sensing a current location and receiving information relating to a current location.

The current location may be transmitted (203). An example of transmitting the current location is to transmit it over a network such as network 102 of FIG. 1, for example in response to a query or in broadcast mode. Further details of transmitting a current location are discussed in conjunction with data transmitter 104 of FIG. 1. In some embodiments, a location may be processed, e.g. to convert a spatial location to a symbolic location such as a location associated with a stop.

It may be determined whether a route is being changed (204). An example of changing a route is to reverse directions on a route. Another example of changing a route is for a conveyance such as a bus, plane or train to change to a different route. Another example of changing a route is for a route to be altered, for example by adding or removing one or more stops. If it is determined that a route is being changed (204), then in this example route-related data is updated (205). An example of updating route-related data is to change contents of route store 106 of FIG. 1, and/or indicate a different route number associated with such data. Route-related data may be transmitted (201).

If it is not determined that a route is being changed (204), then in this example a delay is performed (206). An example of performing a delay is to wait a predetermined period of time, such as ten seconds. Another example of performing a delay is to wait until a query is received. Another example of performing a delay is to wait until another stop has been reached or is being approached. Route-related data may be transmitted (201).

In some embodiments, route-related data and data relating to a current location may be decoupled. For example, data relating to a current location may be sent more frequently than route-related data, and/or route-related data may be sent in response to a query, while time-related data may be sent unsolicited, and/or broadcast. In some embodiments, transmission may be only of route-related data.

In some embodiments, the technique of this FIG. 2 may be performed at a conveyance such as conveyance 101 of FIG. 1.

Figure 3:
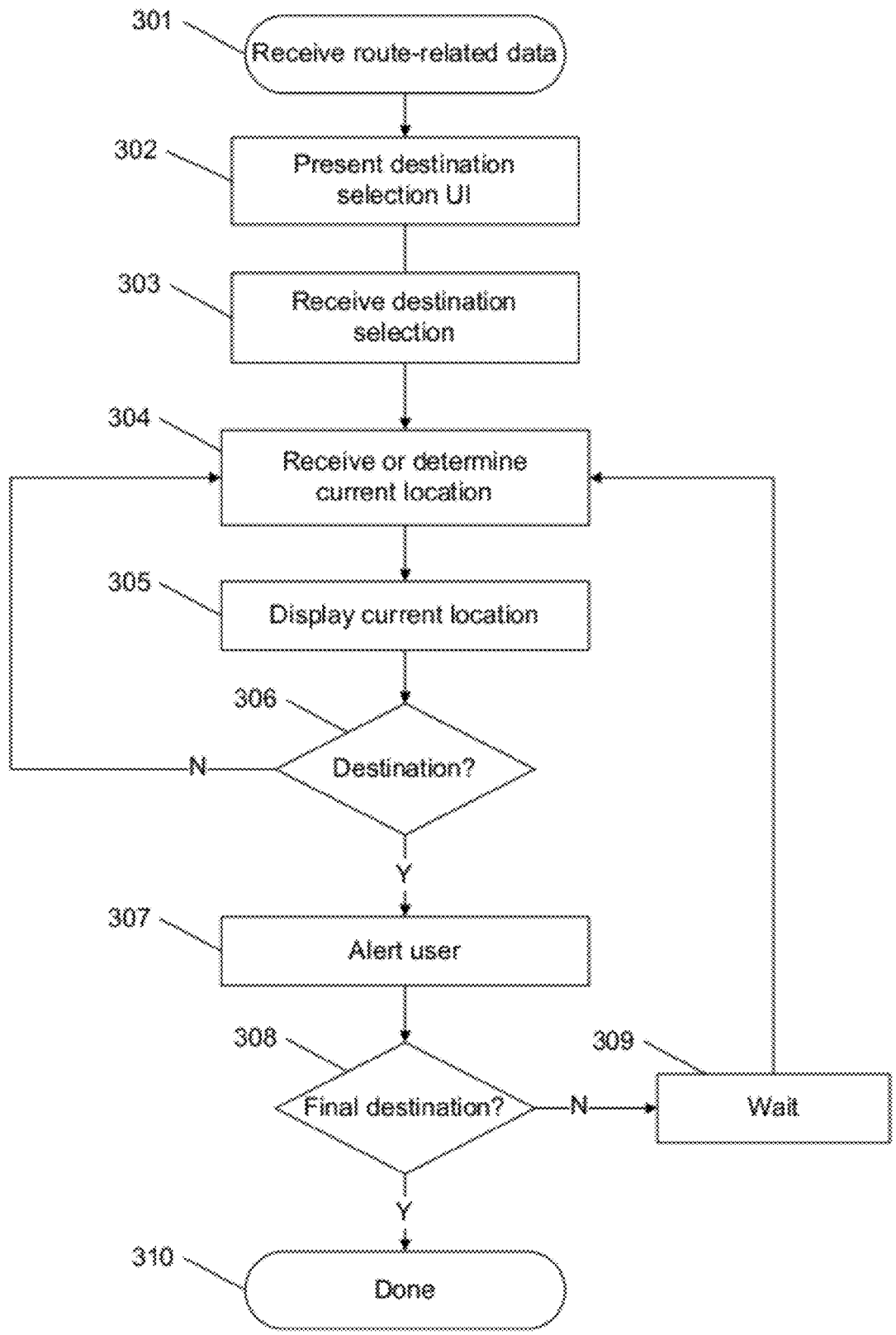
FIG. 3 is a flow diagram of a method for processing a location relative to a route, according to some embodiments.

FIG. 3 is a flow diagram of a method for processing a location relative to a route, according to some embodiments. In this example, route-related data is received (301). Examples of receiving route-related data are discussed in conjunction with data receiver 107 of FIG. 1, and examples of route-related data are discussed in conjunction with conveyance 101 of FIG. 1. In some embodiments, route-related data may have been transmitted as discussed in conjunction with 201 of FIG. 2.

A destination selection user interface may be presented (302). Examples of destination selection user interfaces and destination processing are discussed in conjunction with destination selector UI 112 of FIG. 1, and in some embodiments may include displaying a map of the current route and/or some or all of a transit system map. In some embodiments, a current location may be displayed. In some embodiments, for example when more than one route is received, a choice may be offered for which route to use prior to selection of a destination. In some embodiments, if more than one route is received, one or more routes may be removed from the user interface, or kept from being displayed in the user interface, by determining that a current location, or a sequence of current locations, is inconsistent with the route(s) being removed or kept from being displayed.

A destination selection may be received (303). Examples of receiving a destination selection include receiving a selection from a pulldown menu, receiving a selection such as a click or a touch on a touch-sensitive screen on or near a displayed destination (for example, displayed on a map), a voice input interpreted to be a destination, a user input typed into a user interface element such as a text box, and any other way that a destination may be indicated. A destination selection may be analyzed to determine zero or more transfer destination, for example as discussed in conjunction with destination selection user interface 112 of FIG. 1.

A current location may be received or determined (304). Examples of determining a current location are discussed in conjunction with location comparator 109, device location sensor 108, and data receiver 107 of FIG. 1. In some embodiments, a current location may be received that was transmitted as described in conjunction with 203 of FIG. 2.

The current location may be displayed (305), for example in conjunction with a route map. For example, a route map may be displayed in which the current location is indicated.

It may be determined whether the current location is associated with a destination (306), for example whether the current location is at a destination, approaching a destination, or within a predetermined distance or projected arrival time from a destination stop. Another example of determining whether the current location is associated with a destination is to determine whether the current location is at or upon departing from a stop that is immediately previous to a destination. If it is determined that the current location is not associated with a destination (308), then in this example a current location may be received or determined (304). In some embodiments (not shown), a wait may be performed, such as a wait for a predetermined period of time or a wait until a next stop is reached.

If it is determined that the current location is associated with a destination (306), then in this example the user is alerted (307). Examples of alerting a user are discussed in conjunction with location display 111 of FIG. 1, and include visible, audible and/or vibratory indications. In some embodiments, alerting a user may include indicating that a final destination has been reached, or that a transfer destination has been reached, which may in some embodiments include directions relating to a transfer. In some embodiments, such transfer directions may be factual, such as naming a route and direction to take. In some embodiments, such transfer directions may be descriptive, for example included in route data associated with a transfer point and direction of transfer.

It may be determined whether the destination that is approaching or has been reached is the final destination (308). If it is determined that the destination is final (308), then in this example processing is complete (310).

If it is determined that the destination that is approaching or has been reached is not the final destination (308), for example because it is a transfer destination en route to the final destination, then in this example a wait is performed (309). An example of performing a wait is to wait until a new location is received that does not correspond to the interim destination. A current location may again be received (304) and processed.

In some embodiments, the technique of this FIG. 3 may be performed at a operable device such as portable device 103 of FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving route data at a portable device, wherein the portable device is personal to a passenger on a public conveyance, wherein the route data is associated with a public transit route, wherein the public conveyance is following the public transit route, and wherein the route data includes information relating to a stop;
   determining a destination, wherein the destination is related to the stop;
   determining a current location of the portable device;
   displaying the current location in conjunction with a route map, wherein the route map includes a representation of the route data, and wherein the current location is indicated on the route map;
   determining, based at least in part on the current location, that the portable device has nearly reached the destination, wherein determining that the portable device has nearly reached the destination includes determining that the stop is the next stop relative to the current location; and
   responsive to determining that the portable device has nearly reached the destination, providing an alert at the portable device.

2. The method of claim 1, wherein receiving the route data includes receiving data via a network.

3. The method of claim 1, wherein determining the current location includes receiving a location from a global positioning satellite receiver.

4. The method of claim 1, wherein determining the current location includes receiving a location via a network.

5. The method of claim 1, wherein determining the current location includes receiving a location from the public conveyance.

6. The method of claim 1, wherein determining the destination includes receiving the destination.

7. The method of claim 6, wherein the destination is received via a user interface.

8. The method of claim 6, wherein the destination is received as a voice input.

9. The method of claim 1, wherein determining the destination includes determining a transfer en route to a final destination.

10. The method of claim 1, wherein providing the alert includes providing a visual display.

11. The method of claim 1, wherein providing the alert includes providing an audible sound.

12. The method of claim 1, wherein providing the alert includes providing a transfer instruction.

13. The method of claim 1, wherein the alert includes information relating to the destination.

14. The method of claim 1, further comprising determining a second destination, wherein the destination is a transfer destination en route to the second destination determining a second current location determining that the second current location is related to the second destination; and providing a second alert.

15. A system, comprising:
   a processor in a portable device that is personal to a passenger on a public conveyance, wherein the processor is configured to:
   receive route data, wherein the route data is associated with a public transit route, wherein the public conveyance is following the public transit route, and wherein the route data includes information relating to a stop;
   determine a destination, wherein the destination is related to the stop;
   determine a current location of the portable device;
   display the current location in conjunction with a route map, wherein the route map includes a representation of the route data, and wherein the current location is indicated on the route map;
   determine, based at least in part on the current location, that the portable device has nearly reached the destination, wherein determining that the portable device has nearly reached the destination includes determining that the stop is the next stop relative to the current location; and
   responsive to determining that the portable device has nearly reached the destination, provide an alert at the portable device; and
   a memory coupled with the processor, wherein the memory provides instructions to the processor.

16. The system of claim 15, wherein determining the current location includes receiving a location from a global positioning satellite receiver.

17. The system of claim 15, wherein determining the current location includes receiving a location from the public conveyance.

18. The system of claim 15, wherein determining the destination includes determining a transfer en route to a final destination.

19. The system of claim 15, wherein the processor is further configured to determine a second destination, wherein the destination is a transfer destination en route to the second destination, determine a second current location, determine that the second current location is related to the second destination; and provide a second alert.

20. A computer program product, the computer program product being embodied in a non-transitory computer readable medium and comprising computer instructions for:
   receiving route data at a portable device, wherein the portable device is personal to a passenger on a public conveyance, wherein the route data is associated with a public transit route, wherein the public conveyance is following the public transit route, and wherein the route data includes information relating to a stop;
   determining a destination, wherein the destination is related to the stop;
   determining a current location of the portable device;
   displaying the current location in conjunction with a route map, wherein the route map includes a representation of the route data, and wherein the current location is indicated on the route map;
   determining, based at least in part on the current location, that the portable device has nearly reached the destination, wherein determining that the portable device has nearly reached the destination includes determining that the stop is the next stop relative to the current location; and responsive to determining that the portable device has nearly reached the destination, providing an alert at the portable device.

21. The computer program product of claim 20, wherein determining the current location includes receiving a location from a global positioning satellite receiver.

22. The computer program product of claim 20, wherein determining the current location includes receiving a location from the public conveyance.

23. The computer program product of claim 20, wherein determining the destination includes determining a transfer en route to a final destination.

24. The computer program product of claim 20, wherein the computer readable medium further comprises computer instructions for determining a second destination, wherein the destination is a transfer destination en route to the second destination; determining a second current location; determining that the second current location is related to the second destination; and providing a second alert.

* * * * *